April 12, 1932.    F. PRANTL    1,853,283
ELECTRIC VEHICLE DRIVE
Filed Sept. 8, 1927
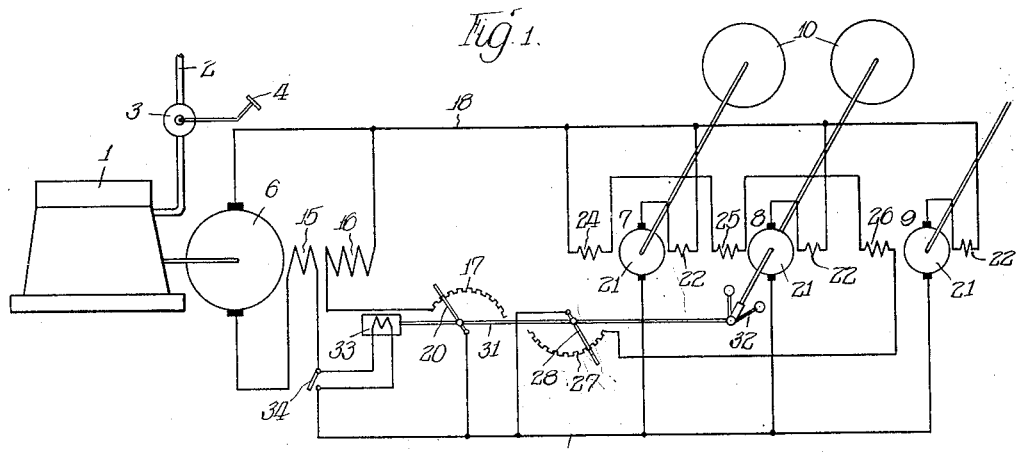
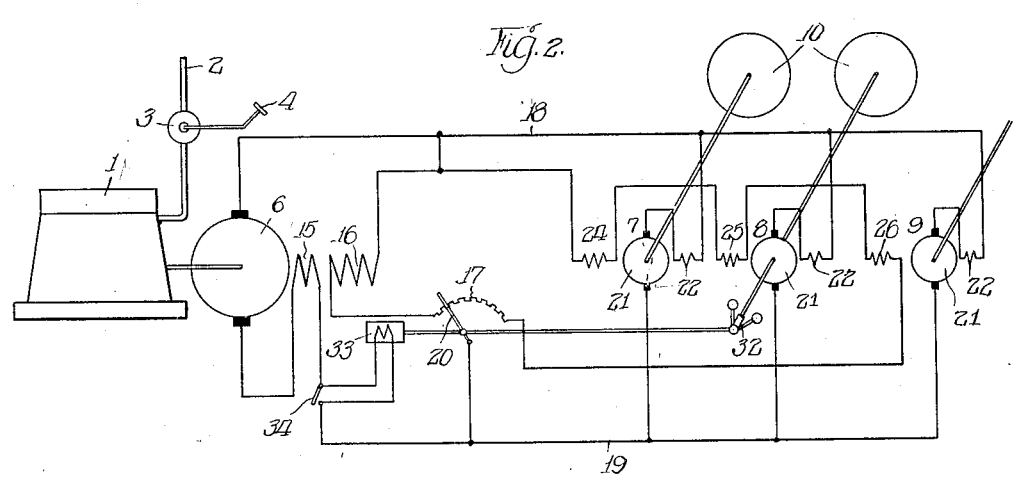
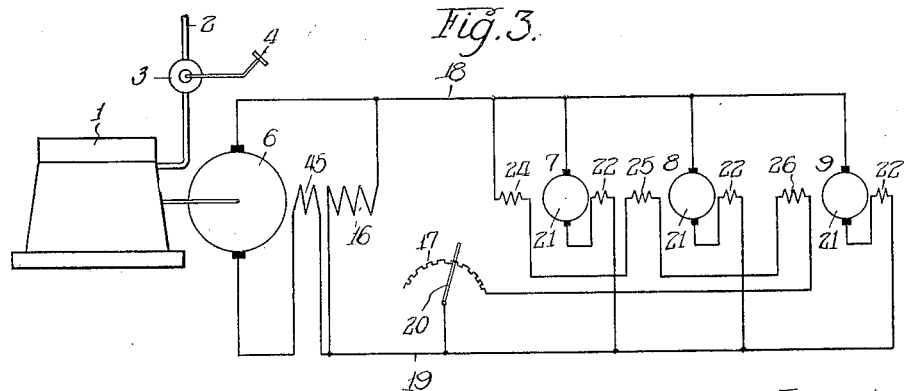
Witness:
R. Burkhardt
Inventor:
Franz Prantl,
By Cromwell, Greist & Warden
attys.

Patented Apr. 12, 1932

1,853,283

UNITED STATES PATENT OFFICE

FRANZ PRANTL, OF BADEN, SWITZERLAND

ELECTRIC VEHICLE DRIVE

Application filed September 8, 1927, Serial No. 218,155, and in Germany December 9, 1926.

This invention relates to electric vehicle drives and it has particular relation to drives wherein an electric generator that is driven by a combustion engine, particularly of the Diesel type, supplies the current for the driving motors of the vehicle.

Among the objects of the invention is the provision of a drive of the foregoing character wherein the current flow conditions between the generator and the driving motors are so controlled as to prevent slipping of the driving wheels by reason of the particular operating characteristics of such combined combustion-engine electric drives.

According to the invention the driving motors are, to this end, provided with supplementary shunt exciting windings in addition to the series windings. During starting and at low speeds, the motors receive relatively high shunt excitation. At high speeds the shunt excitation is weakened or cut out altogether and the motors operate with substantially pure series characteristics. The control of the excitations is effected automatically in response to the speed of the motors or the current flow conditions.

The foregoing, and other objects of the invention, will be best understood from the accompanying drawings wherein Figure 1 is a diagrammatic view of a Diesel electric locomotive drive embodying the invention; and Figs. 2 and 3 are modifications of the embodiment shown in Fig. 1.

One of the difficulties met in the design of locomotives, or, in general vehicle drives, wherein a Diesel engine drives a direct current generator which supplies series-type driving motors of the vehicle, is the fact that because of the characteristics of this type of combustion engine and the ordinary electric drives employed heretofore, the driving wheels tend to slip because the power exerted by the motors approaches the limits of adhesion. The employment of shunt motors in place of series motors avoids the difficulties on account of slipping, but has the drawback of non-uniform distribution of the load among the motors, which makes it unsuitable for the usual multiple motor drives.

According to the invention, the slipping of the driving wheels is prevented without sacrifice in uniform load distribution between the several driving motors by providing the motors with series and shunt-exciting windings and so controlling the same that in starting and at low speeds the motors receive full shunt excitation while at the higher speeds the shunt excitation is greatly weakened or entirely cut off. The high shunt excitation at low speeds will prevent slipping of the motors. At the same time no difficulty will be experienced at the low speeds on account of current being unbalanced between the motors, since the current distribution at low speeds is principally determined by the ohmic drop in the circuits which is relatively large compared with the back electromotive force at the armature terminals of the motors.

At high speeds, the shunt excitation is greatly weakened and the series field predominates, causing the motors to assume series characteristics. At these high speeds there is no danger of wheel slipping, and well balanced current distribution is obtained by reason of the series character of the motor operation.

The addition of the shunt excitation is also advantageous by reason of the fact that it enables control of the motors without requiring tappings on the series exciting windings. It also permits the utilization of smaller generators, since a lesser supply voltage is required for operation at the highest speeds.

A particularly advantageous arrangement is obtained by combining or coupling the shunt-field regulators of the motors with the shut-field regulator of the generator. These regulators are preferably so arranged that as the generator field is strengthened the motor fields are weakened, and vice versa. For example, the excitation of the generator at starting will be small and that of the motors large. As the speed rises, the excitation of the generator is increased and that of the motors diminished. A single control of the whole electrical driving arrangement of the locomotive is thus obtained.

In the foregoing arrangement it is also possible to use a common rheostat for the generator and motor-field circuits so arranged that as the resistance is cut out from the generator circuit it is cut in into the motor circuits. In the preferred construction, the control of the shunt fields of the motors, as well as that of the generator, may be effected automatically in accordance with the speed of the motors or of the vehicle or in accordance with the current flowing into the motors. With such arrangement the manual control of the drive is limited to the fuel supply of the engine.

Another advantageous arrangement is secured if the separate excitation of the generator is arranged to be constant or nearly constant, and the generator poles are provided with an anti-compound or bucking-series windings. With such arrangement the heavy current at starting or at low speed will cause the generator field to be weakened, diminishing its voltage, while securing full voltage at the high speed.

Drives of the character described above are illustrated diagrammatically in the drawings.

In Fig. 1 a Diesel locomotive drive is shown comprising a Diesel engine 1 having a fuel supply line 2 which is controlled by a valve 3 through operation of a control pedal 4 of a familiar type. By controlling the pedal, the power developed by the engine may be readily varied. The Diesel engine has coupled thereto a direct-current generator 6 which is arranged to supply a plurality of direct current driving motors 7, 8 and 9, said motors serving to propel the vehicle, as diagrammatically indicated by the vehicle wheels 10 that are coupled to the motors. The generator 6 has a compounding-series winding 15 and a shunt winding 16, the latter being connected in series with a rheostat 17 between the bus-bars 18 and 19 leading from the generator. The motors 7 to 9 are of the series type and comprise armatures 21 with series windings 22 connected in parallel between the bus-bars 18 and 19. The rheostat 17 has a contact arm 20. By moving said arm from left to right the resistance in the shunt circuit may be gradually increased, cutting down the shunt excitation and reducing the generator voltage.

In addition to the series windings 22 the several motors are provided with shunt-exciting windings 24 to 26 which are connected in series with a motor-field rheostat 27 between the bus-bars 18 and 19. The motor-field rheostat 27 has also a movable contact arm 28 which cuts the resistance into the shunt circuit when in the left hand position, cutting down the shunt-exciting fields of the motors, and cuts out the resistance when the contact arm is in the right hand position, increasing the shunt fields of the motors.

In operating a driving system of the foregoing character the motors are given full shunt excitation at starting or at low speeds by turning the motor rheostat control arm 28 to the right. Accordingly, the motors will have a dominating shunt character at the low speeds and there will be no tendency for the driving wheels of the vehicle to slip. The shunt operation will not interfere with the current distribution between the motors, since the counter-electromotive force developed by the armatures at the low speed will be relatively small, and the current distribution will be principally controlled by the ohmic resistance drop in the motor circuits.

As the speed increases, the rheostat contact arm 28 is moved to the left, gradually increasing the resistance in the shunt-winding circuit. The shunt field is thus gradually cut down with increasing speed until each motor operates substantially as a pure series motor when in the high speed range. The series motor characteristics under the latter operating conditions are very advantageous and will also secure favorable current distribution between the individual parallel-operating motors.

It is advantageous to combine the control of the motor fields with a suitable control of the generator so as to gradually increase the generator voltage as the speed of the motors is being raised. This is effected by the control of the current through the generator-shunt exciting winding 16 by means of the rheostat 17. At low speeds the rheostat contact arm 20 is placed in the right hand position, producing a weak generator field and giving a relatively low voltage at the generator terminals. The contact arm 20 is gradually moved to the left, and the current through the shunt-field winding 16 increased with the rising speed of the vehicle until full voltage is obtained at the generator terminals when the vehicle is at full speed.

In the preferred arrangement, the rheostat control of the generator-shunt winding 16 and of the motor-shunt windings 24 to 26 may be combined by coupling the rheostat contact arms 20 and 28 by means of a coupling arm 31 so that an increase in the generator shunt excitation is accompanied by a decrease in the motor shunt excitation, and vice versa. Optimum operating conditions in the motors and generator over the entire speed range will thus be obtained with a single control mechanism in the electric part of the drive.

A drive of the above described character may be rendered entirely automatic by making the control of the shunt-exciting windings of the motor and of the generator responsive to the operating conditions of the drive so as to establish the motor and generator circuits appropriate for the particular speed or operating condition of the organization. To this end the control rod 31 which links the rheostat arms 20 and 28 may be arranged to be actuated by a governor 32, of the pendulum type for instance, in response to the speed of the driving motors of the vehicle, the governor causing the contact arms 20 and 28 to move toward the right under low speed conditions and toward the left under high speed conditions.

Instead of controlling the positions of the rheostat contact arms 20 and 28 by a speed responsive device, the rheostat may be controlled in response to the variation of the current flowing from the generator 6, as for instance, by means of an actuating solenoid 33. The control operation of the solenoid is based on the fact that the current from the generator to the motors is relatively large at low speeds, when the motors are to be shunt excited, and relatively small at high speeds when the shunt excitation is to be cut down. Accordingly, the solenoid 33 is so arranged that, when traversed by large current corresponding to the low-speed range of the vehicle, the contact arms 20 and 28 will be moved toward the right, and when traversed by low currents corresponding to the highest speeds, the contact arms 20 and 28 will be moved toward the left. A switch 34, is arranged for short-circuiting the solenoid 33 so as to permit cutting out its action. It is thus possible to operate the rheostat control arms either by the governor 32, or by the solenoid 33, or by both. In case the rheostats are to be operated by the solenoid alone, the coupling between the governor 32 and the contact arms 28 and 20 is opened, or the governor control is cut out in some other way.

In the arrangement of Fig. 2, a single rheostat is used for controlling the shunt excitation of the generator 6, as well as of the motors 7 to 9, the several shunt windings being connected in series, with a resistor 17 in the connection between the shunt winding of the generator and the shunt windings of the motors. A contact arm 20 is arranged to slide on the resistor 17, and by moving the contact arm to the left along said resistor, the resistance in the shunt circuit of the generator may be decreased while increasing the resistance in the shunt circuits of the motors, and vice versa.

In the form of the invention shown in Fig. 3, the shunt-exciting winding of the generator is arranged to be permanently connected across the bus-bars 18 and 19, only the shunt-exciting windings of the motors 7 to 9 having a rheostat 17 for controlling the motor-shunt excitation. In order to secure the desired voltage control at the terminals of the generator 6, a special anti-compound or bucking-series winding 45 is provided so as to oppose the excitation supplied by the shunt winding 16. The anti-compound winding 45 is so dimensioned relatively to the shunt excitation winding 16 that for the low speeds, when the current flowing from the generators is relatively large, the bucking winding will greatly reduce the generator voltage. With increasing speed and decreasing generator current, the effect of the bucking-field winding decreases, resulting in an increase of the generator voltage.

By providing automatic regulation of the field excitation of the driving apparatus, it is possible to control the operation of the vehicle and the speed thereof solely by controlling the operation of the Diesel engine which drives the generator, for instance by varying the fuel supply to the engine as by means of pedal 4.

The invention is susceptible of many other modifications that will suggest themselves to those skilled in the art, and it is accordingly desired that the appended claims be given a broad construction commensurate with the scope of the invention within the art.

I claim:

1. In an electrically propelled vehicle, a prime mover, a direct-current generator having a series field winding, a plurality of series driving motors connected in parallel to said generator and driven exclusively by current therefrom, a shunt-exciting winding for said generator, shunt-exciting windings for said motors, a controller for regulating the shunt excitation of said generator, a controller for regulating the shunt excitation of said motors, and common operating means for jointly actuating said controllers to produce a decrease of the generator excitation while causing an increase in the motor excitation, and vice versa.

2. In an electrically propelled vehicle, a prime mover, a direct-current generator having a series field winding, a plurality of series driving motors connected in parallel to said generator and driven exclusively by current therefrom, a shunt-exciting winding for said generator, shunt-exciting windings for said motors, a controller for regulating the shunt excitation of said generator, a controller for regulating the shunt excitation of said motors, common operating means for jointly actuating said controllers to produce a decrease of the generator excitation while causing an increase in the motor excitation, and means responsive to the speed of the said vehicle for controlling the operation of said common operating means to reduce the shunt excitation of said motors with increase of the speed thereof.

3. In an electrically-propelled vehicle, a manually-controlled prime mover having variable speed and variable load characteristics, a direct-current generator driven by said prime mover at a speed varying directly as the speed thereof, said generator having a series field winding, a plurality of series-connected motors supplied by said generator, said motors having variable speed and variable torque characteristics, a shunt-exciting winding for said generator, shunt-exciting windings for said motors, a controller for regulating the shunt excitation of said generator, a controller for regulating the shunt excitation of said motors, and common operating means for jointly actuating said controllers to produce a decrease in the generator excitation while causing an increase in the motor excitation, and vice versa.

4. In an electrically-propelled vehicle, a manually-controlled prime mover having variable speed and variable load characteristics, a direct-current generator driven by said prime mover at a speed varying directly as the speed thereof, said generator having a series field winding, a plurality of series-connected motors supplied by said generator, said motors having variable speed and variable torque characteristics, a shunt-exciting winding for said generator, shunt-exciting windings for said motors, a controller for regulating the shunt excitation of said generator, a controller for regulating the shunt excitation of said motors, common operating means for jointly actuating said controllers to produce a decrease of the generator excitation while causing an increase in the motor excitation, and vice versa, and means responsive to the speed of said vehicle for controlling the operation of said common operating means.

5. In a power system of the character described, an electrical generator, a prime mover for driving said generator, a plurality of series-field motors each connected across the output terminals of said generator, field windings connected in series relation with respect to each other and associated respectively with said motors, and variable resistance means, said series-connected windings being connected across said terminals by way of said resistance means.

In testimony whereof I have hereunto subscribed my name this 17th day of June, A. D. 1927, at Zurich, Switzerland.

FRANZ PRANTL.